United States Patent
Mellick

(10) Patent No.: US 9,628,314 B1
(45) Date of Patent: Apr. 18, 2017

(54) DIGITAL I/Q REPROCESSING DEMODULATOR (DIRD)

(71) Applicant: David Mellick, Hayden, ID (US)

(72) Inventor: David Mellick, Hayden, ID (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/871,721

(22) Filed: Sep. 30, 2015

Related U.S. Application Data

(60) Provisional application No. 62/148,054, filed on Apr. 15, 2015.

(51) Int. Cl.
| | |
|---|---|
| *H04L 27/22* | (2006.01) |
| *H04B 1/12* | (2006.01) |
| *H04L 27/26* | (2006.01) |
| *H04L 27/227* | (2006.01) |
| *H04L 27/233* | (2006.01) |
| *H04B 10/2507* | (2013.01) |
| *H04L 12/863* | (2013.01) |
| *H04L 27/38* | (2006.01) |
| *H04L 27/00* | (2006.01) |

(52) U.S. Cl.
CPC ......... *H04L 27/2657* (2013.01); *H04B 1/123* (2013.01); *H04L 27/22* (2013.01); *H04L 27/2275* (2013.01); *H04L 27/2277* (2013.01); *H04L 27/2338* (2013.01); *H04L 27/3863* (2013.01); *H04L 47/6245* (2013.01); *H04L 2027/0059* (2013.01); *H04L 2027/0061* (2013.01); *H04L 2027/0067* (2013.01)

(58) Field of Classification Search
CPC ..... H04L 2027/0061; H04L 2027/0053; H04L 2027/0059; H04L 2027/0067; H04L 27/2277; H04L 27/2275; H04L 27/2657; H04L 27/2338; H04L 27/22; H04L 27/3863; H04B 1/123
See application file for complete search history.

(56) References Cited

U.S. PATENT DOCUMENTS

| | | | |
|---|---|---|---|
| 4,151,609 A | * | 4/1979 Moss | ..................... G06F 5/08 326/131 |
| 4,583,048 A | * | 4/1986 Gumacos | ............ H04L 27/2273 329/302 |

(Continued)

OTHER PUBLICATIONS

Rajan et al., "Efficient approximations for the arctangent function," in Signal Processing Magazine, IEEE, vol. 23, No. 3, pp. 108-111, May 2006.*

(Continued)

*Primary Examiner* — Michelle M Koeth
(74) *Attorney, Agent, or Firm* — Dave A. Ghatt

(57) ABSTRACT

A digital I/Q reprocessing demodulator and a process for significantly reducing arctangent computational loads. This is done by ensuring that all calculations are carried out in the linear part of the curve. The architecture of the demodulator is such that the demodulator 100 utilizes two I/Q stages. The first stage is utilized to determine a phase offset with regards to the free-running I/Q clocks. In the second processing stage, the phase of the I/Q reference signals are phase shifted based on the initial estimate such that the incoming carrier signal is nearly in-phase.

3 Claims, 3 Drawing Sheets

(56) References Cited

U.S. PATENT DOCUMENTS

| | | | |
|---|---|---|---|
| 8,760,631 B2* | 6/2014 | Ritter | G01J 1/46 |
| | | | 356/3 |
| 8,842,498 B2 | 9/2014 | Cahalan et al. | |
| 8,873,609 B2 | 10/2014 | Ezaki et al. | |
| 9,196,298 B1* | 11/2015 | Zhang | G11B 20/10481 |
| 2012/0060615 A1* | 3/2012 | Farhadiroushan | G01D 5/35303 |
| | | | 73/655 |

OTHER PUBLICATIONS

Ganssle, "A Guide to Approximations," The Ganssle Group, 2001 (http://www.ganssle.com/approx/approx.pdf last accessed Jun. 1, 2016).*

Callahan et al., Calculus in Context, Chapter 10, Five Colleges, Inc., Feb. 2008.*

* cited by examiner

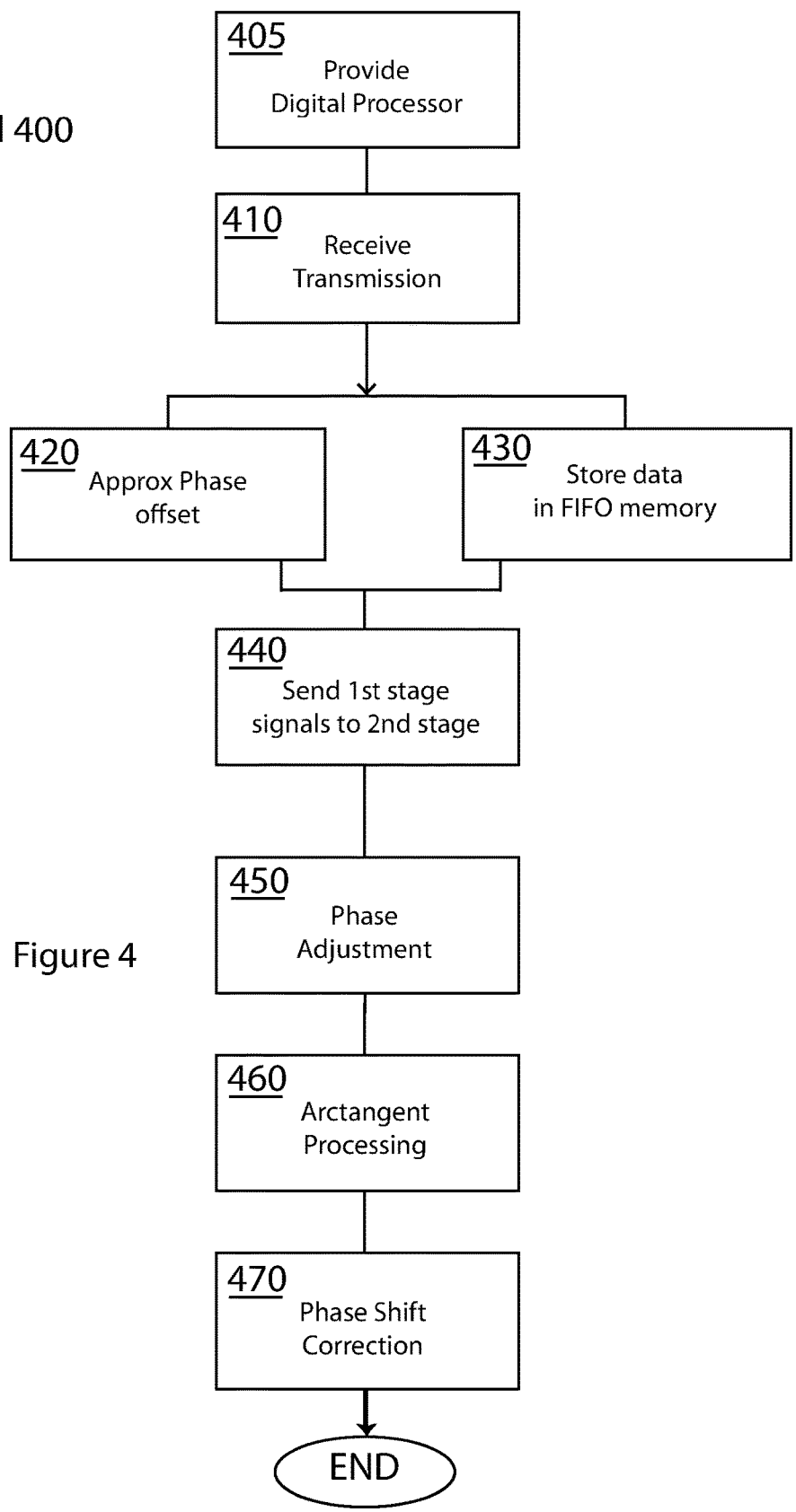

DIGITAL I/Q REPROCESSING DEMODULATOR (DIRD)

CROSS-REFERENCE TO RELATED APPLICATIONS

This application claims the benefit of U.S. Provisional Application No. 62/148,054, filed Apr. 15, 2015, which is incorporated herein by reference.

This application is related to U.S. provisional patent application No. 62/148,042, filed Apr. 15, 2015, hereby incorporated herein by reference, entitled "Dynamic Range Extension of Heterodyne Fiber-Optic Interferometers Via Instantaneous Carrier Measurement" by inventor David Mellick, who is also the sole inventor of the instant patent application.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a digital I/Q reprocessing demodulator and a process for significantly reducing arctangent computational loads.

BACKGROUND

Demodulation of heterodyne interferometric signals has traditionally been accomplished with a combination of hardware and firmware as shown in FIG. 1. The front end is comprised of various analog circuit stages. This includes a photodiode 5, a trans-impedance amplifier (TIA) 10, analog frequency mixers (20, 22), and low-pass filters (30, 32). The signal outputs of the LPFs are digitized by analog to digital converters (40, 42). The two digital values (the In-phase and Quadrature components of the incoming carrier signal) are then used to calculate an arctangent value and recover the phase signal of interest. This arctangent computation is performed in the digital domain and can be accomplished through the use of either a digital signal processor (DSP) or Field Programmable Gate Array (FPGA). However, calculation of the arctangent value in the digital domain is very computationally intensive. Likewise, an exponential relationship exists in the required computational resources used and the error in the computed valued. The lower the required error, the more computational resources and processing that is needed.

Various techniques exist for computing the arctangent within a digital system. The three most common methods include look-up-tables (LUTs), the CORDIC algorithm, and a Taylor series computation. All three methods however, would require an excessive amount of computational cycles to meet the low error requirement (<1uradian) of a low phase noise heterodyne demodulator.

As opposed to the analogue to digital demodulator outlined above and shown in FIG. 1, the invention is directed towards an all-digital demodulator. It should be noted that some all-digital demodulator designs are also known in the art. For example, FIG. 2 is an exemplary illustration of an all-digital demodulator that is known in the prior art. As compared to the arrangement of FIG. 1, in the embodiment of FIG. 2, the analog frequency mixers and the analog LPFs have been moved to the digital domain 52. A single ADC 41 now directly digitizes the incoming heterodyne carrier signal 10, following the photodiode 5 and TIA 10. The I/Q frequency mixing is now performed using digital multipliers (21, 23). Finite Impulse Response (FIR) filters (31, 33) are used to replace the analog low-pass filters. The FIG. 2 illustration is a comparable digital implementation of the above analog embodiment, however, there is no inherent reduction in arctangent processing requirements using the all-digital approach. It is desired to have a digital I/Q reprocessing demodulator that improves upon the above-outlined basic digital demodulator, particularly one that is faster and utilizes processing time more efficiently.

SUMMARY

In one aspect, the invention is a digital I/Q reprocessing demodulator having a digital processor with a first stage unit and a second stage unit. In this aspect, the first stage unit includes a first pair of digital multipliers, and a first pair of finite impulse response filters, each of the first pair of finite impulse response filters connected to a respective one of the first pair of digital multipliers. The first stage unit also includes a phase offset estimator connected to and receiving signals from the pair of finite impulse response filters, the phase offset estimator determining an initial phase offset with regards to free-running I/Q clocks. The first stage unit also includes a FIFO memory for storing raw digitized carrier samples while said initial phase offset is being computed. In this aspect, the second stage unit has a second pair of digital multipliers, and a second pair of finite impulse response filters, each of the second pair of finite impulse response filters connected to a respective one of the second pair of digital multipliers. The second stage unit also includes an arctangent processing unit estimator connected to and receiving signals from the pair of finite impulse response filters. The arctangent processing unit estimator is for calculating arctangent values and for producing a final arctangent output within a range R, defined by a substantially linear range of an output curve for an arctangent function. In this aspect, the second stage unit also includes a phase accumulation calculator at which the amount to which the multipliers were phase shifted is subtracted from the final arctangent output.

In another aspect, the invention is a method of I/Q reprocessing. In this aspect, the method includes the providing of a digital processor having a first stage unit and a second stage unit. In this aspect, the first stage unit is provided with a first pair of digital multipliers, and a first pair of finite impulse response filters, each of the first pair of finite impulse response filters connected to a respective one of the first pair of digital multipliers. The first stage unit is also provided with a phase offset estimator connected to and receiving signals from the pair of finite impulse response filters, and a FIFO memory. The second stage unit is provided with a second pair of digital multipliers, and a second pair of finite impulse response filters, each of the second pair of finite impulse response filters connected to a respective one of the second pair of digital multipliers. The second stage unit is also provided with an arctangent processing unit estimator connected to and receiving signals from the pair of finite impulse response filters. According to this method, the second stage unit is also provided with a phase accumulation calculator. In this aspect, the method of I/Q reprocessing includes the receiving of a transmission within the processor, and the approximating of a phase offset with regards to the free-running I/Q clocks using the phase offset estimator. The method also includes the storing of data related to raw digitized carrier samples in the FIFO memory for later processing, and the transmitting of phase offset estimate data and data from the FIFO memory to the second stage elements. The method further includes the phase adjusting of digital multipliers of the second stage such that they are nearly in phase with the data contained in the FIFO, and calculating arctangent values based on the phase-adjusted values so that calculations are within the range R. In this aspect, R is defined by a substantially linear range of an output curve for an arctangent function. The method of this invention also includes the subtracting of the amount which the multipliers were phase shifted from the final arctangent output, with the phase accumulation calculator performing this task.

BRIEF DESCRIPTION OF THE DRAWINGS

Other features will be apparent from the description, the drawings, and the claims.

FIG. 4 is a flow chart outlining a process of I/Q reprocessing by the processor, according to an embodiment of the invention.

DETAILED DESCRIPTION

Figure 1:
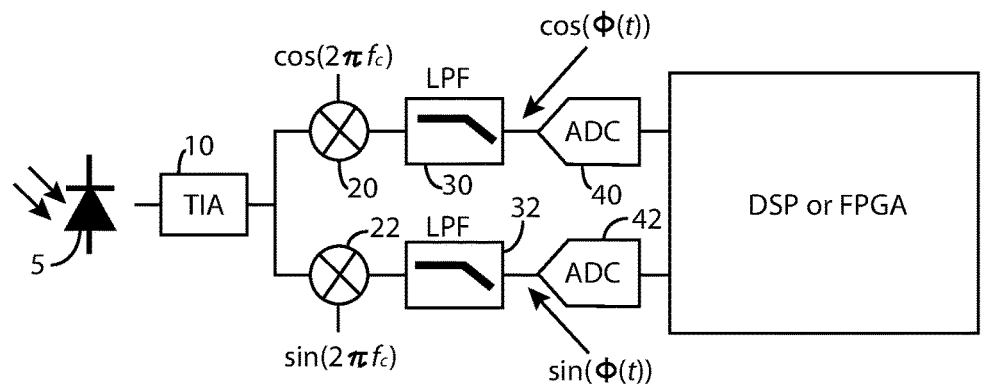
FIG. 1 is an exemplary illustration of an analogue to digital arrangement for the demodulation of heterodyne interferometric signals, according to know what is known in the prior art.
Figure 2:
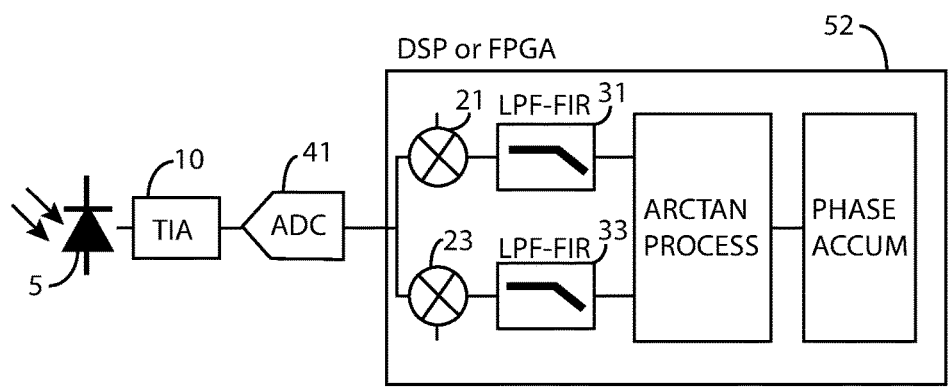
FIG. 2 is an exemplary illustration of a digital to digital arrangement for the demodulation of heterodyne interferometric signals, according to know what is known in the prior art.
Figure 3A:
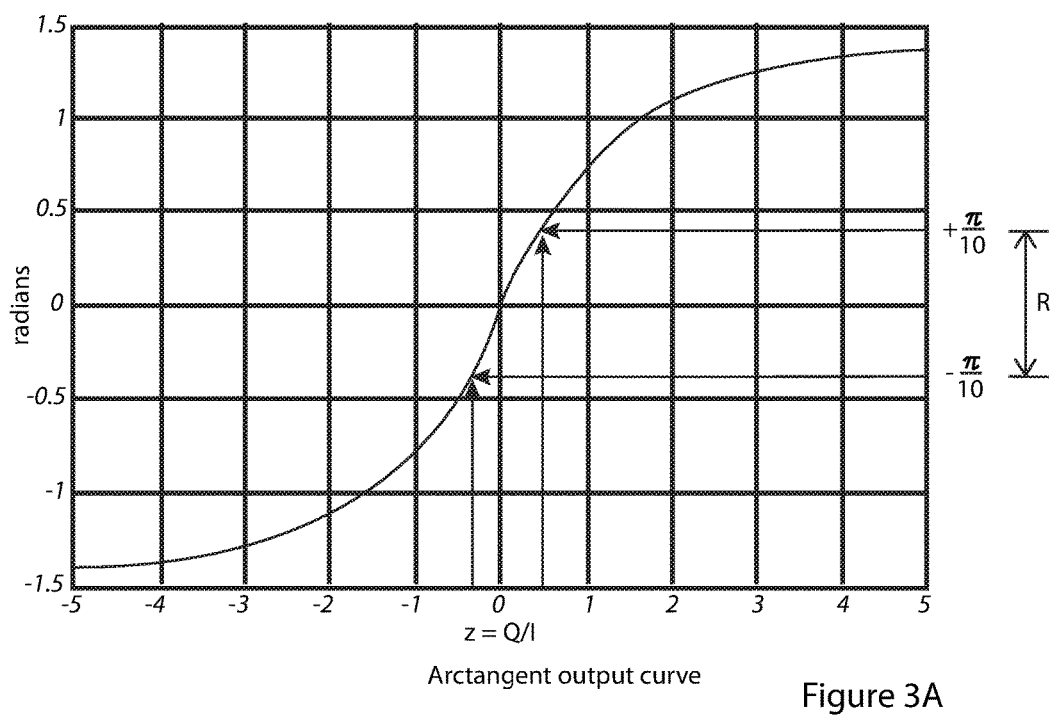
FIG. 3A is an exemplary illustration of an output curve for an arctangent function showing the calculation range R for arctangent processing, according to the invention.

The invention is directed towards a demodulator that significantly reduces arctangent computational load. The reduction in arctangent computational load is accomplished by ensuring that all calculations are carried out within the substantially linear part of the output curve for the relevant arctangent function. FIG. 3A is an exemplary illustration of an output curve for an arctangent function showing the calculation range R for arctangent processing, according to the invention.

Arctangent processing is one of the most computationally intensive parts of the digital demodulation process. Numerous approaches exist for arctangent calculation. Three common approaches to arctangent computation are the CORDIC algorithm, look-up tables, and Taylor series approximations. The amount of processing time required by each is a direct function of the input value and the required output accuracy. Most implementations require an output that is accurate to approximately 1 μrad so as to not introduce an additional source of error. The input value z will have the largest impact on the amount of required processing.

As stated above, FIG. 3A shows the output curve for the arctangent function. For input values of z between ±0.3, the output will be in the range of ±π/10. As shown in FIG. 3A, within this range R (±π/10) the arctangent output is substantially linear. The further away from this region, the more the output becomes non-linear. Regardless of the computational approach, arctangent calculations within the substantially linear section of the function will require far less processing than those outside. For example, an arctangent calculation using a Taylor series approximation can be defined as:

$$\arctan(z)=z-z^3/3+z^5/5+z^7/7+\ldots \qquad (1.0)$$

If the input value z to the arctangent function is 0.3, then only the first three terms of the Taylor series are sufficient to meet the 1 μrad error requirement. However, if z lies only slightly in the non-linear part of the curve, at a value of 0.99, then as many 350 terms are required. As this example illustrates, it is highly desirable to limit the arctangent processing to the substantially linear portion of the curve. One arctangent calculation is required for each demodulation point. This may be as many as 1-2 million per second. Such processing requirements can pose a problem if not handled properly. Consequently, one of the goals of the instant invention is to limit arctangent processing to the calculation range R shown in FIG. 3A.

Figure 3B:
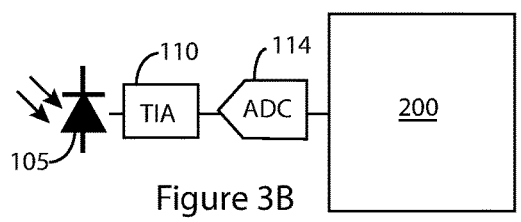
FIG. 3B is an exemplary illustration of a digital I/Q reprocessing demodulator, according to an embodiment of the invention.

FIG. 3B is an exemplary illustration of a digital I/Q reprocessing demodulator (DIRD) 100, according to an embodiment of the invention. As outlined below, the demodulator 100 significantly reduces arctangent computational load by ensuring that all calculations are carried out in the linear part of the curve. The architecture of the demodulator 100 is such that the demodulator 100 utilizes two I/Q stages. The first stage is utilized to determine a phase offset with regards to the free-running I/Q clocks. While the initial phase estimate is being computed, raw digitized carrier samples are stored to a memory. When the phase offset estimate has been computed, the carrier samples stored to the memory are again processed in the second I/Q processing stage. However, in the second processing stage, the phase of the I/Q reference signals are phase shifted based on the initial estimate such that the incoming carrier signal is nearly in-phase.

As shown in FIG. 3B, the digital I/Q reprocessing demodulator (DIRD) 100 includes a photodiode 105 and a trans-impedance amplifier (TIA) 110. A single ADC 114 may be employed to directly digitize the incoming heterodyne carrier signal, following the photodiode 105 and TIA 110. As shown, the demodulator includes a digital processor 200, which be a digital signal processor (DSP), a field programmable gate array (FPGA), or a combination thereof.

Figure 3C:
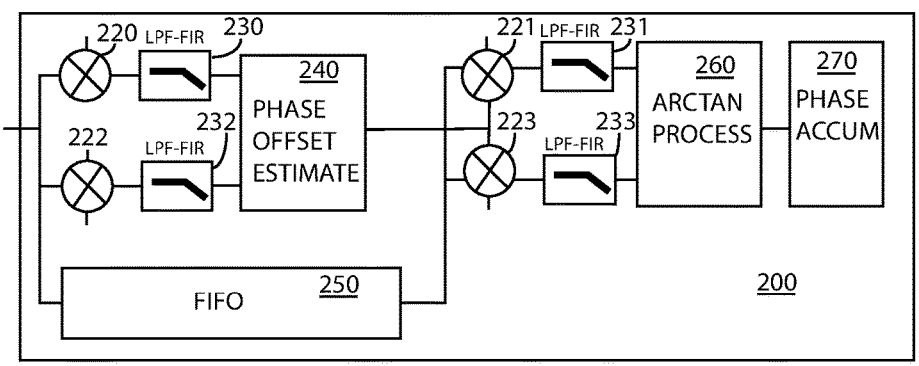
FIG. 3C is an exemplary illustration of a digital I/Q reprocessing demodulator showing the architecture of the digital processor, according to an embodiment of the invention.

FIG. 3C is an exemplary illustration of a digital I/Q reprocessing demodulator (DIRD) 100 showing the architecture of the digital processor 200, according to an embodiment of the invention. As stated above processor 200 may be a digital signal processor (DSP), a field programmable gate array (FPGA), or a combination thereof. As shown, the processor 200 includes digital multipliers 220 and 222 and finite impulse response filters (FIRs) 230 and 232, as each channel being demodulated requires a pair of multipliers and FIR filters. The FIRs 230 and 232 may be known filters such as simple rectangular averaging filters or may be more advanced implementations, depending on the available input data or the system requirements for high frequency noise suppression. The FIRs 230 and 232 are connected to a phase offset estimator 240. FIG. 3B also shows FIFO memory 250.

The above described elements are first stage elements, performing first stage functions according to the invention.

FIG. 3C also shows the processor 200 having second stage elements downstream of the first stage elements. These include digital multipliers 221 and 223 and finite impulse response filters (FIRs) 231 and 233. Again, the FIRs 231 and 233 may be known filters such as simple rectangular averaging filters or may be more advanced implementations, depending on the available input data or the system requirements for high frequency noise suppression. FIG. 3C also shows the second stage elements including an arctangent processing unit 260 and a phase accumulation calculator 270.

FIG. 4 is a flow chart outlining the process 400 of I/Q reprocessing by the processor 200, according to an embodiment of the invention. The process 400 outlined is performed by the DIRD apparatus 100 outlined above in FIGS. 3B and 3C. The process 400 may be applied to heterodyne modulated fiber optic interferometers. More generally, the process 400 may be used to improve the demodulation process of any phase modulated system utilizing a Zero-IF receiver.

According to the process 400, step 405 is the providing of a digital processor 200 having a first stage unit and a second stage unit. The features of the digital processor 200 have been outlined above, and have been illustrated in FIGS. 3A, 3B, and 3C. Step 410 is the receipt of a transmission via the photodiode 105, the trans-impedance amplifier (TIA) 110, and the ADC 114. The transmission is digitized by the ADC 114.

At step 420, an approximate phase offset with regards to the free-running I/O clocks is determined. Here, the incoming heterodyne modulated signal is mixed with the in-phase and phase shifted carrier signal using multipliers 220 and 222. The output of these multipliers are then low-pass filtered using FIR filters 230 and 232 to obtain the in-phase (I) and quadrature (Q) components of the original incoming heterodyne signal. A phase offset can then be determined by taking the ratio of the I and Q components and either extracting an approximate arctangent value from a look-up table or from computing a three term Taylor series approximation.

At step 430, incoming data is stored in the FIFO memory 250 for later processing. The data that is stored is the same incoming heterodyne signal as is used for computing the initial phase offset estimate. The data is stored so that once an initial phase estimate offset has been determined it can be reprocessed after shifting the next I/Q demodulator stage by the obtained phase shift estimate. It should be noted that step 430 is performed simultaneous with the performance of step 420. Additionally, steps 410, 420, 430 are first stage steps. As outlined above the process 400 is a two-stage process. The second stage of I/Q reprocessing by the processor 200, includes steps 440 and 450.

At step 440, signals, including the phase offset estimate, from the phase offset estimator 240 as well as data from the FIFO memory 250 are sent to the second stage elements and received at the digital multipliers 221 and 223. At step 450 the digital multipliers of the second stage are phase adjusted such that they are nearly in phase with the data contained in the FIFO, thus ensuring that the magnitude of the z value (as shown in FIG. 3A) passed to the arctangent processing circuitry is always less than 0.3.

At step 460 the arctangent processing unit calculates arctangent values within the range R shown in FIG. 3A. The arctangent computational requirements may be met with a simple three-term Taylor series calculation. At step 470, at the phase accumulation calculator 470, the amount to which the multipliers were phase shifted is then subtracted to the final arctangent output. Essentially, during this process, a known phase amount is shifted to align for processing, with this known amount is subtracted out at the end. By using this technique, although the I/Q reprocessing requires two stages and some additional hardware resources, the overall computational simplification is significant.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A digital I/Q reprocessing demodulator comprising:
   a photodiode;
   a trans-impedance amplifier;
   an analogue to digital converter;
   a digital processor having a first stage unit and a second stage unit, wherein the first stage unit comprises:
   a first pair of digital multipliers;
   a first pair of finite impulse response filters, each of the first pair of finite impulse response filters connected to a respective one of the first pair of digital multipliers;
   a phase offset estimator connected to and receiving signals from the first pair of finite impulse response filters, the phase offset estimator determining an initial phase offset with regards to free-running I/Q clocks; and
   a FIFO memory for storing raw digitized carrier samples of unknown phases while said initial phase offset is being determined, said storing of raw digitized carrier samples of unknown phases and the determining of said initial phase offset being conducted simultaneously; and
   wherein the second stage unit comprises:
   a second pair of digital multipliers;
   a second pair of finite impulse response filters, each of the second pair of finite impulse response filters connected to a respective one of the second pair of digital multipliers;
   an arctangent processing unit estimator connected to and receiving signals from the second pair of finite impulse response filters, the arctangent processing unit estimator for calculating arctangent values and producing a final arctangent output within a range R between $+\pi/10$ and $-\pi10$, the range R, defining a substantially linear range of an output curve for an arctangent function with Q/I input values between +0.3 and −0.3, wherein only the first three terms of a Taylor Series are necessary to meet a 1 μrad error requirement; and
   a phase accumulation calculator at which an amount to which the second pair of digital multipliers were phase shifted is subtracted from the final arctangent output, wherein the photodiode, the trans-impedance amplifier, and the analogue to-digital converter are attached to the digital processor, providing said raw digitized carrier samples of unknown phases thereto and wherein the digital I/Q reprocessing demodulator is electronically attached to a heterodyne modulated fiber optic interferometer to demodulate said raw digitized carrier samples of unknown phases from said heterodyne modulated fiber optic interferometer.

2. A method of I/Q reprocessing comprising:

providing a photodiode;

providing a trans-impedance amplifier;

providing an analogue to digital converter;

providing a digital processor comprising a first stage unit and a second stage unit, wherein the first stage unit comprises:

a first pair of digital multipliers;

a first pair of finite impulse response filters, each of the first pair of finite impulse response filters connected to a respective one of the first pair of digital multipliers;

a phase offset estimator connected to and receiving signals from the first pair of finite impulse response filters; and a FIFO memory; and wherein the second stage unit comprises:

a second pair of digital multipliers;

a second pair of finite impulse response filters, each of the second pair of finite impulse response filters connected to a respective one of the second pair of digital multipliers;

an arctangent processing unit estimator connected to and receiving signals from the second pair of finite impulse response filters, the arctangent processing unit estimator for calculating arctangent values and producing a final arctangent output; and a phase accumulation calculator;

the method further comprising:

receiving raw digitized carrier samples of unknown phases within the digital processor;

approximating a phase offset with regards to free-running I/Q clocks using the phase offset estimator;

storing data related to said raw digitized carrier samples of unknown phases in the FIFO memory for later processing, wherein the storing of said raw digitized carrier samples of unknown phases and the approximating of the initial phase offset is conducted simultaneously;

transmitting phase offset estimate data and data from the FIFO memory to the second stage unit;

phase adjusting the second pair of digital multipliers of the second stage unit, calculating the arctangent values and producing the final arctangent output within a range R between $+\pi/10$ and $-\pi/10$, the range R defining a substantially linear range of an output curve for an arctangent function with Q/I input values between +0.3 and −0.3, wherein only the first three terms of a Taylor Series are necessary to meet a 1 μrad error requirement; and subtracting an amount which the second pair of digital multipliers of the second stage unit were phase-adjusted from the final arctangent output, with the phase accumulation calculator performing this task, wherein the photodiode, the trans-impedance amplifier, and the analogue to digital converter are attached to the digital processor, providing said raw digitized carrier samples of unknown phases thereto.

3. The method of claim 2, wherein the approximating said phase offset comprises:

mixing an incoming heterodyne modulated signal with both in-phase and phase-shifted carrier signals, using the first pair of digital multipliers;

low-pass filtering an output signal from the first pair of digital multipliers, using the first pair of finite impulse response filters to obtain in-phase (I) and quadrature Q components; and determining the phase offset value by taking a ratio of the I and Q components.

* * * * *